Aug. 25, 1959     A. BRUEDER     2,900,966
TWO-STROKE ENGINES
Filed Nov. 29, 1956
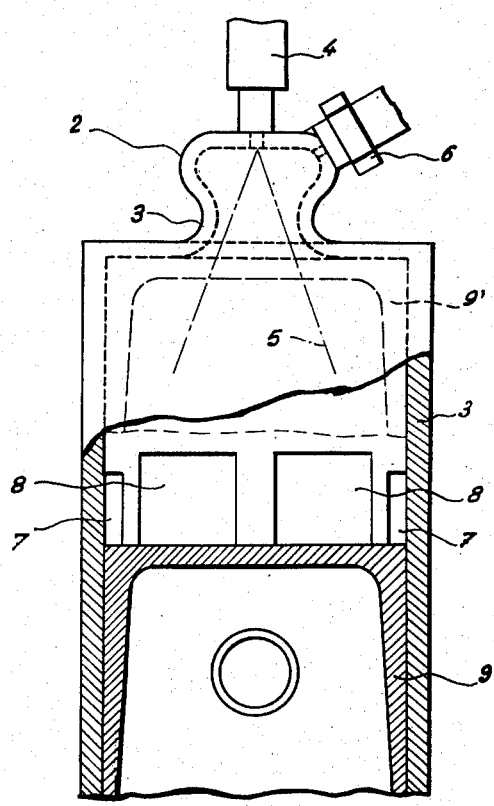
Inventor
Antoine Brueder
By his attorneys United States Patent Office
2,900,966
Patented Aug. 25, 1959

2,900,966

TWO-STROKE ENGINES

Antoine Brueder, Paris, France, assignor to Societe Anonyme Andre Citroen, Paris, France, a French company Application November 29, 1956, Serial No. 625,078

Claims priority, application France April 16, 1956

3 Claims. (Cl. 123—32)

This invention relates to two-stroke engines of the fired ignition type, i.e. the type wherein the ignition is initiated e.g. by means of a spark plug.

In this type of engine the power output is varied by varying the scavenging air ratio, i.e. the ratio of the rate of volume flow of air delivered, to the volume generated per unit time by the pistons of the engine. As a result, for the lower power outputs, the combustible gases are made to mix with burnt gases and considerable difficulty is experienced in order to produce smooth combustion under such operating conditions.

Depending on the type of fuel supply system used— carburetor or direct injection—the cylinder of a two-stroke engine prior to the combustion period may contain either (1) burnt gases and a substantially uniform mixture of air and fuel, or (2) air, burnt gases and fuel. The fuel may occur both in the air and the burnt gases. In engines known at the present time, it is endeavoured to initiate the ignition within an area comprising the combustion mixture. This is no easy task since the scavenging air generates a general turbulence as a result of which both the combustible gases and the burnt gases are simultaneously in motion and it is impossible to find a point for ignition which would be surrounded with combustible gases under all circumstances. This results in discontinuous operation and misfiring at low loads. In the case of a direct injection engine, satisfactory ignition is particularly difficult to achieve owing to the fact that, as just indicated, the fuel may be distributed both in the combustion air and in the burnt gases.

In Patent No. 2,587,339, owned by the assignee of this application, there is described an internal combustion engine of the fuel injection type wherein a high degree of turbulence of the heterogeneous fuel and combustion air mixture is produced at the end of the compression period and the ignition is initiated in the resulting turbulent area.

It is an object of the present invention to apply the means disclosed in that patent to a two-stroke engine in which the scavenging air ratio is low and in which as a result there obtains a heterogeneous mixture of air, fuel and burnt gases.

According to the present invention high turbulence is produced at the end of compression in the heterogeneous mixture of air, fuel and burnt gases and the ignition is effected within the turbulent area. Just as the aforementioned prior patent which achieved a correct combustion of the heterogeneous mixture of air and fuel, similarly in the instant case a satisfactory combustion of the heterogeneous mixture of air, fuel and burnt gases is obtained.

One embodiment of the invention is described hereinafter by way of example but not limitation with reference to the accompanying drawing which is a schematic cross sectional view of a cylinder of a two-stroke engine.

As shown in the drawing, the cylinder 1 comprises at its top a turbulence chamber 2 separated from the cylinder proper by a neck 3, and the inner walls of this chamber may for example be provided with the toroidal shape shown. Opening into the chamber 2 is an injection nozzle 4 discharging a jet 5 of fuel which may for example be formed as a conical jet or may comprise a plurality of elementary jets. A spark plug 6 is fitted in the wall of the turbulence chamber. Formed in the wall of cylinder 1 are intake ports 7 and exhaust ports 8. The piston 9 within the cylinder 1 is adapted at the upper dead centre point to assume the position 9' indicated in broken lines.

The operation at low scavenging air ratios is the following: Fuel is injected into the turbulence chamber 2 near the end of the scavenging period to avert the discharge of fuel into the exhaust; the piston 9 rises and forces the mixture of air fuel and burnt gases towards and into the turbulence chamber 2. Ignition occurs prior to the instant that the piston has reached its upper dead centre position 9'.

It will be understood that the invention is not restricted to the single form of embodiment described and illustrated but that it includes any modifications thereof.

What I claim is:

1. In a two-cycle internal combustion engine including a cylinder, a piston reciprocable in said cylinder and having a top dead center position, means to inject fuel into the cylinder near the end of the scavenging period at least at low scavenging ratios to form a heterogeneous mixture of air, fuel and burnt gases, a turbulence chamber beyond the top of the cylinder, a relatively restricted passage connecting said chamber and said cylinder, said passage being unobstructed and of the same area throughout the piston stroke, said chamber being adapted for receiving the compressed mixture of air, fuel and burnt gases therein as the piston reaches said position and for imparting turbulence thereto in said chamber, and ignition means in the chamber for firing the turbulent compressed mixture.

2. In a two-cycle internal combustion engine of the type described including a cylinder and a piston reciprocable therein and having a top dead center position, a turbulence chamber connected with the top of the cylinder by a relatively restricted passage which is unobstructed and of the same area throughout the piston stroke, fuel injection means in said chamber adapted for injecting fuel through the chamber into the cylinder, means to cause said fuel injection near the end of the scavenging period to generate a heterogeneous mixture of fuel, air and burnt gases, said mixture being compressed into said chamber as the piston reaches said dead center position and having a turbulent condition imparted to it in said chamber, and ignition means in said chamber adapted for firing a mixture of said fuel with combustion air.

3. A two-cycle internal combustion engine comprising a cylinder and a piston reciprocable therein, inlet and exhaust ports for admitting air and exhausting burnt gases from said cylinder, a turbulence chamber at the top of said cylinder having a restricted passage freely connecting said chamber with said cylinder when said piston is at its uppermost or dead center position, means to inject fuel through said turbulence chamber into said cylinder near the end of the scavenging period at least at low scavenging ratios to form a heterogeneous mixture of air, fuel and burnt gases, said chamber receiving the compressed mixture of air, fuel and burnt gases therein as the piston reaches said dead center position and imparting turbulence to said mixture in said chamber, and ignition means in said chamber for firing the turbulent compressed mixture.

References Cited in the file of this patent

UNITED STATES PATENTS

| | | |
|---|---|---|
| 887,393 | Haselwander | May 12, 1908 |
| 1,235,725 | Power | Aug. 7, 1917 |
| 1,354,786 | Tartrais | Oct. 5, 1920 |
| 1,580,340 | Severin | Apr. 13, 1926 |
| 2,025,362 | Starr | Dec. 24, 1935 |
| 2,065,025 | Ricardo | Dec. 22, 1936 |
| 2,142,280 | Mock | Jan. 3, 1939 |
| 2,164,234 | Erren | June 27, 1939 |
| 2,695,600 | Goschel | Nov. 30, 1954 |

FOREIGN PATENTS

| | | |
|---|---|---|
| 87,433 | Switzerland | Dec. 1, 1920 |
| 818,526 | France | June 21, 1937 |

OTHER REFERENCES

Ser. No. 237,472, Scherneberg (A.P.C.), published May 11, 1943.